US012752243B2

(12) United States Patent
Takechi et al.

(10) Patent No.: US 12,752,243 B2
(45) Date of Patent: Oct. 6, 2026

(54) HOLLOW FIBER MICROPOROUS MEMBRANE, AND GAS SEPARATION MEMBRANE MODULE WITH SAME BUILT THEREINTO

(71) Applicant: Toray Industries, Inc., Tokyo (JP)

(72) Inventors: Shingo Takechi, Otsu (JP); Hiroo Katsuta, Otsu (JP); Hidekazu Kano, Otsu (JP); Masaki Fujita, Otsu (JP)

(73) Assignee: Toray Industries, Inc., Tokyo (JP)

( * ) Notice: Subject to any disclaimer, the term of this patent is extended or adjusted under 35 U.S.C. 154(b) by 338 days.

(21) Appl. No.: 18/683,646

(22) PCT Filed: Aug. 23, 2022

(86) PCT No.: PCT/JP2022/031651

§ 371 (c)(1),
(2) Date: Feb. 14, 2024

(87) PCT Pub. No.: WO2023/027052

PCT Pub. Date: Mar. 2, 2023

(65) Prior Publication Data

US 2025/0135405 A1 May 1, 2025

(30) Foreign Application Priority Data

Aug. 23, 2021 (JP) ................................ 2021-135414

(51) Int. Cl.
*B01D 69/02* (2006.01)
*B01D 19/00* (2006.01)
(Continued)

(52) U.S. Cl.
CPC ......... *B01D 69/02* (2013.01); *B01D 19/0031* (2013.01); *B01D 53/22* (2013.01);
(Continued)

(58) Field of Classification Search
CPC ................ B01D 69/02; B01D 19/0031; B01D 69/087; B01D 2325/021; B01D 2325/0283;
(Continued)

(56) References Cited

U.S. PATENT DOCUMENTS 8,409,325 B2 4/2013 Yoshinaga et al.
9,546,785 B1 * 1/2017 Baker .................... F23L 7/007
(Continued)

FOREIGN PATENT DOCUMENTS

CN 110898677 3/2020
JP 52-137026 11/1977
(Continued)

OTHER PUBLICATIONS

International Search Report dated Oct. 25, 2022, of counterpart International Application No. PCT/JP2022/031651, along with an English translation.
(Continued)

*Primary Examiner* — Frank M Lawrence, Jr.
(74) *Attorney, Agent, or Firm* — DLA Piper LLP (US)

(57) ABSTRACT

A high-quality microporous hollow fiber membrane having high gas permeability, gas selectivity, and strength. A microporous hollow fiber membrane, having a carbon dioxide gas flux of $10\times10^{-5}$ to $200\times10^{-5}$ ($cm^3$(STP)/$cm^2$/sec/cmHg), a value (carbon dioxide gas flux/nitrogen gas flux) obtained by dividing a value of a carbon dioxide gas flux by a value of a nitrogen gas flux ($cm^3$(STP)/$cm^2$/sec/cmHg) of 1.3 or more, and a tensile strength of 0.5 cN/dtex or more.

18 Claims, 3 Drawing Sheets

(51) Int. Cl.
*B01D 53/22* (2006.01)
*B01D 69/08* (2006.01)

(52) U.S. Cl.
CPC ...... *B01D 69/087* (2013.01); *B01D 2325/021* (2013.01); *B01D 2325/0283* (2022.08); *B01D 2325/04* (2013.01); *B01D 2325/24* (2013.01); *B01D 2325/38* (2013.01)

(58) Field of Classification Search
CPC ............ B01D 2325/04; B01D 2325/24; B01D 2325/38; B01D 67/0025; B01D 67/0027; B01D 2325/02; B01D 2325/20; B01D 63/02; B01D 69/08; B01D 53/22; B01D 53/221; B01D 53/223; B01D 53/224
USPC .................... 95/43, 46, 52, 54; 96/4, 6–8, 10
See application file for complete search history.

(56) References Cited

U.S. PATENT DOCUMENTS

| | | | | |
|---|---|---|---|---|
| 2005/0145107 | A1 | 7/2005 | Kessler et al. | |
| 2018/0161731 | A1 * | 6/2018 | Coignet | B01D 53/228 |
| 2018/0272290 | A1 | 9/2018 | Cho et al. | |
| 2023/0182086 | A1 * | 6/2023 | Ho | B01D 53/228<br>95/51 |

FOREIGN PATENT DOCUMENTS

| | | |
|---|---|---|
| JP | 61-296113 | 12/1986 |
| JP | 3-238029 | 10/1991 |
| JP | 06-121920 | 5/1994 |
| JP | 07-116483 | 5/1995 |
| JP | 9-296320 | 11/1997 |
| JP | 2000-84368 | 3/2000 |
| JP | 2002-35557 | 2/2002 |
| JP | 2005-515061 | 5/2005 |
| JP | 2010-269307 | 12/2010 |
| JP | 2017-516652 | 6/2017 |

OTHER PUBLICATIONS

Yasuda, H. et al., "Pore Size of Microporous Polymer Membranes," *Journal of Applied Polymer Science*, vol. 18(3): p. 805, Mar. 1974, https://doi.org/10.1002/app.1974.070180316, Abstract Only.

Kojima, T. et al., "Sulphur Dioxide Retention By Calcined Limestone Under Oxygen Lean Conditions," *Journal of Chemical Engineering of Japan*, vol. 18(5): p. 435, 1985. https://doi.org/10.1252/jcej.18.432.

Extended European Search Report dated Jul. 9, 2025, from counterpart European Application No. 22 86 1340.

* cited by examiner

HOLLOW FIBER MICROPOROUS MEMBRANE, AND GAS SEPARATION MEMBRANE MODULE WITH SAME BUILT THEREINTO

TECHNICAL FIELD

This disclosure relates to a gas separation membrane for controlling the amount of a dissolved gas in a liquid.

BACKGROUND

Gas separation membranes are a material that realizes deaeration and aeration of a liquid, and are used as a base member of a deaeration membrane and an oxygenator.

Among them, a hollow fiber gas separation membrane has a high specific surface, and can contribute to downsizing of a gas separation membrane module.

Examples of the main index related to the performance of gas separation include gas permeability and gas selectivity, and highly achieving both the gas permeability and the gas selectivity can contribute to further downsizing of a module.

The highly strengthening, for example, by stretching a gas separation membrane to orient the molecular chains can also reduce the membrane thickness, which can contribute to further downsizing of a module.

As described above, to realize further downsizing of a module, a microporous hollow fiber membrane having gas permeability, gas selectivity, and strength has been required.

Japanese Patent Laid-open Publication No. 2010-269307 and Japanese Patent Laid-open Publication No. 6-121920 disclose techniques related to a microporous hollow fiber membrane in which a minute through hole is intentionally formed in a gas separation layer to obtain a microporous hollow fiber membrane excellent in gas permeability.

Japanese Patent Laid-open Publication No. 7-116483 and National Publication of International Patent Application No. 2017-516652 disclose techniques of forming a skin layer composed of polymethylpentene on a porous support layer to obtain a microporous hollow fiber membrane excellent in high gas selectivity.

Japanese Patent Laid-open Publication No. 2000-84368 discloses a technique of obtaining a composite microporous hollow fiber membrane in which a homogeneous thin membrane is interposed between polyolefin porous support layers using a triple composite nozzle to obtain a microporous hollow fiber membrane excellent in high gas selectivity.

Further, National Publication of International Patent Application No. 2005-515061 discloses a technique to obtain a microporous hollow fiber membrane having both high gas permeability and high gas selectivity by a solution spinning method through thermally induced phase separation.

However, in the methods of Japanese Patent Laid-open Publication No. 2010-269307 and Japanese Patent Laid-open Publication No. 6-121920, a minute through hole is intentionally formed in a gas separation layer, and thus there is a problem of low gas selectivity. In the methods of Japanese Patent Laid-open Publication No. 7-116483 and National Publication of International Patent Application No. 2017-516652, the thickness of the skin layer is insufficient, in the method of Japanese Patent Laid-open Publication No. 2000-84368, the thickness of the homogeneous thin membrane is insufficient, and thus there is a problem of low gas permeability. The method of National Publication of International Patent Application No. 2005-515061 has a problem of low strength.

As described above, in conventional techniques, a microporous hollow fiber membrane having high gas permeability and gas selectivity, and strength cannot be obtained.

SUMMARY

We thus provide:

(1) A microporous hollow fiber membrane, having a carbon dioxide gas flux of $10\times10^{-5}$ to $200\times10^{-5}$ ($cm^3$(STP)/$cm^2$/sec/cmHg), a value (carbon dioxide gas flux/nitrogen gas flux) obtained by dividing a value of a carbon dioxide gas flux ($cm^3$(STP)/$cm^2$/sec/cmHg) by a value of a nitrogen gas flux ($cm^3$(STP)/$cm^2$/sec/cmHg) of 1.3 or more, and a tensile strength of 0.5 cN/dtex or more.

(2) The microporous hollow fiber membrane according to (1), having a nitrogen gas flux of $8\times10^{-5}$ to $160\times10^{-5}$ ($cm^3$(STP)/$cm^2$/sec/cmHg).

(3) The microporous hollow fiber membrane according to (1) or (2), having an oxygen gas flux of $9\times10^{-5}$ to $180\times10^{-5}$ ($cm^3$(STP)/$cm^2$/sec/cmHg) and a value (oxygen gas flux/nitrogen gas flux) obtained by dividing a value of an oxygen gas flux ($cm^3$(STP)/$cm^2$/sec/cmHg) by a value of a nitrogen gas flux ($cm^3$(STP)/$cm^2$/sec/cmHg) of 1.15 or more.

(4) The microporous hollow fiber membrane according to any one of (1) to (3), wherein a thickness of a skin layer composed of a fine-grained crystalline having a diameter of 10 nm or less is 200 nm or more.

(5) The microporous hollow fiber membrane according to any one of (1) to (4), including: a hydrophobic material having an interconnected pore having an average interconnected pore radius of 0.005 μm or less.

(6) The microporous hollow fiber membrane according to any one of (1) to (5), including: a slit-like pore on a wall surface of an inner space of a hollow fiber.

(7) A gas separation membrane module, including: the microporous hollow fiber membrane according to any one of (1) to (6).

Our microporous hollow fiber membrane has the above-mentioned configuration, and thus a high-quality microporous hollow fiber membrane having high gas permeability and gas selectivity, and strength.

DESCRIPTION OF REFERENCE SIGNS

Figure 1:
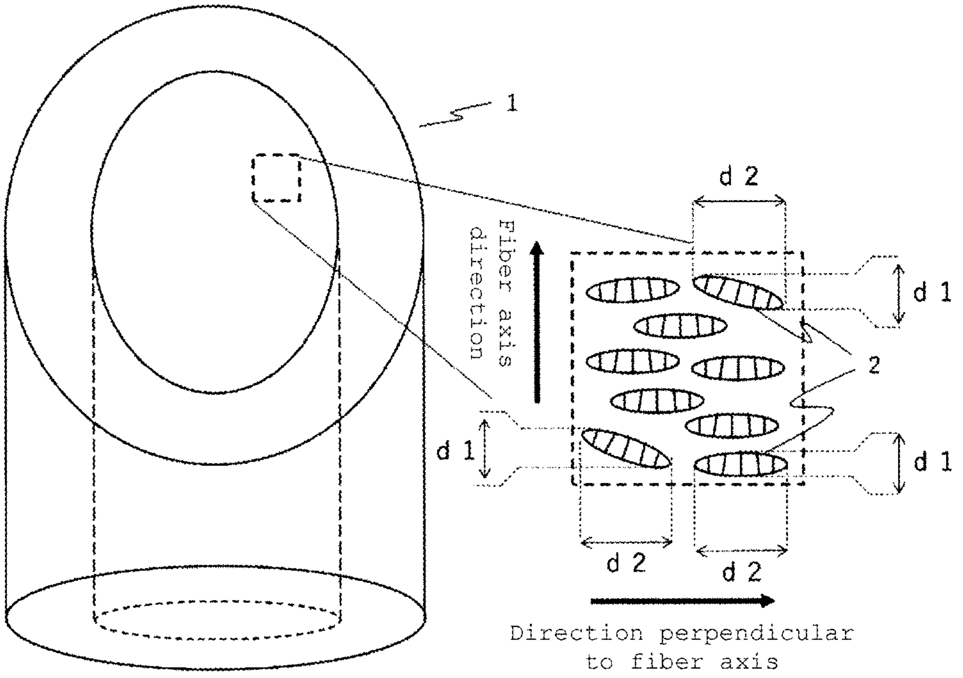
FIG. 1 shows a schematic view for explaining a method of measuring a pore diameter d1 in the fiber axis direction and a pore diameter d2 in the direction perpendicular to the fiber axis of slit-like pores on a wall surface of an inner space of the hollow fiber (a view obtained by cutting the hollow fiber diagonally).

1: Microporous hollow fiber membrane
2: Slit-like pore on wall surface of inner space of microporous hollow fiber membrane
d1: Diameter in fiber axis direction
d2: Diameter in direction perpendicular to fiber axis

DETAILED DESCRIPTION

Hereinafter, our membranes and modules will be described in detail together with desirable examples.

The microporous hollow fiber membrane is a microporous hollow fiber membrane having fine pores inside the membrane, and has high gas permeability, gas selectivity, and strength.

The gas permeability refers to the degree of the amount of the gas flux evaluated by a differential pressure method in accordance with JIS K 7126-1:2006 (Plastics—Film and sheeting—Determination of gas-transmission rate—Part 1: Differential—pressure method).

The carbon dioxide gas flux in the microporous hollow fiber membrane is $10\times10^{-5}$ to $200\times10^{-5}$ [$cm^3$(STP)/$cm^2$/sec/cmHg], preferably $15\times10^{-5}$ to $100\times10^{-5}$ [$cm^3$(STP)/$cm^2$/sec/cmHg], and further preferably $20\times10^{-5}$ to $50\times10^{-5}$ [$cm^3$(STP)/$cm^2$/sec/cmHg].

The nitrogen gas flux in the microporous hollow fiber membrane is preferably $8\times10^{-5}$ to $160\times10^{-5}$ [$cm^3$(STP)/$cm^2$/sec/cmHg], further preferably $11\times10^{-5}$ to $80\times10^{-5}$ [$cm^3$(STP)/$cm^2$/sec/cmHg], and most preferably $15\times10^{-5}$ to $40\times10^{-5}$ [$cm^3$(STP)/$cm^2$/sec/cmHg].

The oxygen gas flux in the microporous hollow fiber membrane is preferably $9\times10^{-5}$ to $180\times10^{-5}$ [$cm^3$(STP)/$cm^2$/sec/cmHg], further preferably $12\times10^{-5}$ to $90\times10^{-5}$ [$cm^3$(STP)/$cm^2$/sec/cmHg], and most preferably $16\times10^{-5}$ to $45\times10^{-5}$ [$cm^3$(STP)/$cm^2$/sec/cmHg].

The larger the amount of the gas flux, the higher the gas exchange efficiency when the microporous hollow fiber membrane is used as a gas separation membrane, which can contribute to downsizing of a module. On the other hand, when the amount of the gas flux is too large, many defects are present on the membrane surface so that the gas selectivity described later tends to decrease, which is not preferable. Thus, it is important that the microporous hollow fiber membrane have the amount of the gas flux in the above-described range.

The gas selectivity refers to a degree of the ratio of the amount of the flux of one gas to the amount of the flux of the other gas.

In the microporous hollow fiber membrane, the value (carbon dioxide gas flux/nitrogen gas flux) obtained by dividing a value of a carbon dioxide gas flux ($cm^3$(STP)/$cm^2$/sec/cmHg) by a value of a nitrogen gas flux ($cm^3$(STP)/$cm^2$/sec/cmHg) is 1.3 or more, preferably 1.5 or more, further preferably 1.7 or more, and most preferably 1.9 or more.

In the microporous hollow fiber membrane, the value (oxygen gas flux/nitrogen gas flux) obtained by dividing a value of an oxygen gas flux ($cm^3$(STP)/$cm^2$/sec/cmHg) by a value of a nitrogen gas flux ($cm^3$(STP)/$cm^2$/sec/cmHg) is preferably 1.15 or more, further preferably 1.20 or more, and most preferably 1.25 or more.

The better the gas selectivity, the higher the gas exchange efficiency when the microporous hollow fiber membrane is used as a gas separation membrane, which can contribute to downsizing of a module. On the other hand, the gas selectivity and the amount of the gas flux described above are in a trade-off relationship, and the amount of the gas flux tends to decrease as the gas selectivity increases.

The value (carbon dioxide gas flux/nitrogen gas flux) obtained by dividing a value of a carbon dioxide gas flux ($cm^3$(STP)/$cm^2$/sec/cmHg) by a value of a nitrogen gas flux ($cm^3$(STP)/$cm^2$/sec/cmHg) has a larger difference in gas molecular weights for comparing the amount of the flux than the value (oxygen gas flux/nitrogen gas flux) obtained by dividing a value of an oxygen gas flux ($cm^3$(STP)/$cm^2$/sec/cmHg) by a value of a nitrogen gas flux ($cm^3$(STP)/$cm^2$/sec/cmHg), and thus the gas selectivity in the microporous hollow fiber membrane can be accurately evaluated.

Thus, it is important that the value (carbon dioxide gas flux/nitrogen gas flux) obtained by dividing a value of a carbon dioxide gas flux ($cm^3$(STP)/$cm^2$/sec/cmHg) by a value of a nitrogen gas flux ($cm^3$(STP)/$cm^2$/sec/cmHg) have the gas selectivity in the above-described range, and it is preferable that the value (oxygen gas flux/nitrogen gas flux) obtained by dividing a value of an oxygen gas flux ($cm^3$(STP)/$cm^2$/sec/cmHg) by a value of a nitrogen gas flux ($cm^3$(STP)/$cm^2$/sec/cmHg) have the gas selectivity in the above-described range.

The strength refers to a tensile strength per unit weight.

The tensile strength in the microporous hollow fiber membrane is 0.5 cN/dtex or more, preferably 0.8 cN/dtex or more, and further preferably 1.0 cN/dtex or more. The tensile strength is preferably 15.0 N/mm2 or more, more preferably 25.0 N/mm2 or more, and further preferably 27.0 N/mm2 or more. The larger the tensile strength is, the thinner the membrane thickness can be, which can contribute to downsizing of a module. On the other hand, though the tensile strength is preferably as high as possible, the toughness tends to decrease as the tensile strength increases, and thus it is important that the microporous hollow fiber membrane have the tensile strength in the above-described range. The microporous hollow fiber membrane has a dense functional layer as the outermost layer and a porous supporting layer as the inner layer, that is, has a so-called asymmetric structure in the membrane thickness direction. The dense functional layer as the outermost layer is a layer having an average interconnected pore described later, and the thickness of the dense functional layer as the outermost layer is defined by a value L (μm) obtained by formulas (1) to (3) described later.

The interconnected pore can be defined as an interconnected pore formed by micropores in the hollow fiber interconnecting from the surface of the hollow fiber to the inner space of the hollow fiber, and the average interconnected pore radius is defined by a value determined by the pressure dependence of the gas flux using nitrogen gas, and can be determined by the method described in Journal of Applied Polymer Science Vol. 18 p. 805 and Journal of Chemical Engineering of Japan Vol. 18 p. 435.

In the dense functional layer, fine pores having a diameter of several nm to several tens of nm slightly exist as pores interconnecting with the porous supporting layer as the inner layer, and eventually with a slit-like pore on the wall surface of the inner space of the hollow fiber described later, and the average interconnected pore radius refers to the size of pores in the dense functional layer as the outermost layer. On the other hand, many slit-like pores exist in the porous support layer as the inner layer, and the slit-like pore in the wall surface of the inner space of the hollow fiber refers to a pore in the porous supporting layer as the inner layer.

The crystal structure in the vicinity of the surface layer in the microporous hollow fiber membrane is preferably in the form of fine-grained particles having a diameter of 10 nm or less. When the crystal structure in the vicinity of the surface layer is in the form of fine-grained particles having a diameter of 10 nm or less, defects are less likely to occur in the dense functional layer in the stretching step described later, and high gas exchange performance can be obtained.

Figure 5:
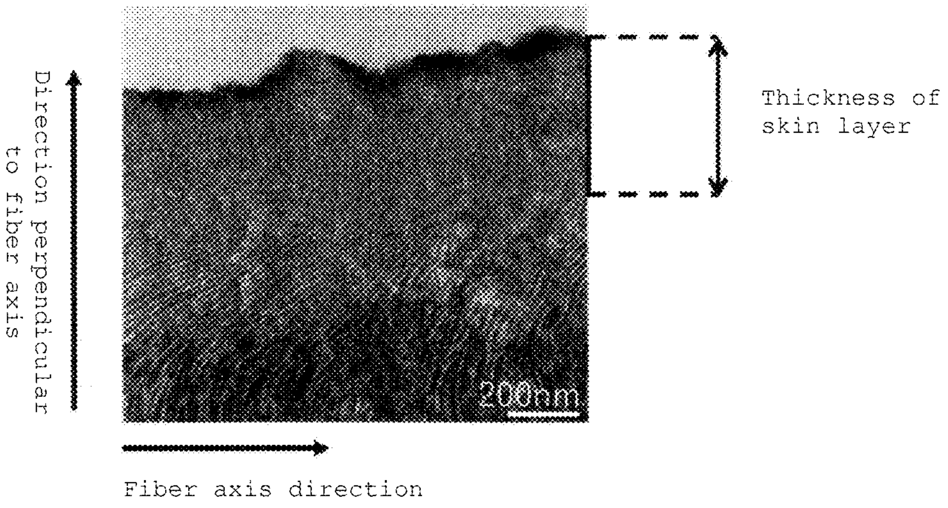
FIG. 5 shows a schematic view for explaining an example of a morphology observation result (TEM photographed image) in the vicinity of the outermost layer in the cross section of the microporous hollow fiber membrane obtained in Example 2 and a method for evaluating the thickness of a skin layer.

The skin layer refers to a layer composed of crystals in the form of fine-grained particles having a diameter of 10 nm or less and not containing a laminated crystal lamella, and as exemplified in FIG. 5, the shortest distance from the laminated crystal lamella to the fiber surface is taken as the thickness of the skin layer. The "crystals in the form of fine-grained particles" refers to a crystal in which the ratio of the length of the major axis to the length of the minor axis is 3 or less, and the laminated crystal lamella refers to a crystal in which the ratio of the length of the major axis to the length of the minor axis is more than 3.

The thickness of the skin layer is preferably 200 nm or more, more preferably 300 nm or more, further preferably 400 nm or more, and most preferably 500 nm or more. The thickness of the skin layer is preferably 900 nm or less, more preferably 800 nm or less, further preferably 700 nm or less, and most preferably 600 nm or less. When the thickness of the skin layer is a suitable thickness, defects are less likely to occur in the dense functional layer in the stretching step described later, high gas exchange performance can be obtained, and further, decrease in the gas permeation performance can also be prevented.

The thickness of the dense functional layer as the outermost layer is a value L (μm) obtained from the following formulas (1) to (3), and is preferably 1.2 μm or less, more preferably 0.8 μm or less, further preferably 0.6 μm or less, and most preferably 0.4 μm or less. The smaller the thickness of the functional layer, the larger the amount of the gas flux, and thus, it is preferable that the functional layer have the above-described thickness. On the other hand, though the lower limit of the thickness of the functional layer is preferably as small as possible, the technical lower limit can be, for example, 0.1 μm or more.

$$\alpha = (M_{N2}/M_{CO2})^{0.5} \times x + (J_{CO2}/J_{N2}) \times (1-x) \qquad \text{formula (1)}$$

α: Value obtained by dividing value of carbon dioxide gas flux ($cm^3$(STP)/$cm^2$/sec/cmHg) by value of nitrogen gas flux ($cm^3$(STP)/$cm^2$/sec/cmHg) (–)

(carbon dioxide gas flux/nitrogen gas flux)

$M_{N2}$: Nitrogen gas molecular weight (g/mol)

$M_{CO2}$: Carbon dioxide gas molecular weight (g/mol)

x: Percentage of flow rate through interconnected pore (–)

$J_{N2}$: Nitrogen gas permeability coefficient ($cm^3$·cm/$cm^2$/s/(dyn/$cm^2$)) of polymer that constitutes microporous hollow fiber membrane $J_{CO2}$: Carbon dioxide gas permeability coefficient $cm^3$·cm/$cm^2$/s/(dyn/$cm^2$)) of polymer that constitutes microporous hollow fiber membrane $$J_{S.D.} = J \times (1-x) \qquad \text{formula (2)}$$

$J_{S.D.}$: Flux not passing through interconnected pore ($cm^3$/$cm^2$/s/(dyn/$cm^2$))

J: Nitrogen gas flux ($cm^3$/$cm^2$/s/(dyn/$cm^2$))

$$L = J_{N2}/J_{S.D.} \qquad \text{formula (3)}$$

L: Thickness of dense functional layer as outermost layer (μm)

The thickness was determined by determining the value of $J_{S.D.}$ from the formula (2) based on the value of x determined from the formula (1) using the value obtained by dividing a value of a carbon dioxide gas flux ($cm^3$(STP)/$cm^2$/sec/cmHg) obtained by measuring the carbon dioxide gas flux by a value of a nitrogen gas flux ($cm^3$(STP)/$cm^2$/sec/cmHg) obtained by measuring the nitrogen gas flux, and substituting the value of $J_{S.D.}$ into the formula (3). As $J_{N2}$ and $J_{CO2}$, literature values can be used and, for example, in polymethylpentene, $J_{N2}$ is $6.6\times10^{-10}$, and $J_{CO2}$ is $93.0\times10^{-10}$.

The average interconnected pore radius in the microporous hollow fiber membrane is preferably 0.005 μm or less, further preferably 0.003 μm or less, and most preferably 0.002 μm or less. The larger the average interconnected pore radius is, the larger the amount of the gas flux is, while the lower the gas selectivity is. Thus, the average interconnected pore radius is preferably in the above-described range.

The slit-like pore on the wall surface of the inner space of the hollow fiber refers to a pore elongated in the direction perpendicular to the fiber axis direction observed in the inner space of the hollow fiber. In the microporous hollow fiber membrane, the slit-like pores are uniformly distributed, and thus the wall surface of the inner space of the hollow fiber has a substantially honeycomb-like morphology. Although the causal relationship is not clear, such a structure presumably contributes to the exhibition of high membrane strength.

The size of the slit-like pore is preferably 10 nm to 10 μm, further preferably 50 nm to 5 μm, and most preferably 100 nm to 2 μm. The ratio d1/d2 of the pore diameter d1 in the fiber axis direction to the pore diameter d2 in the direction perpendicular to the fiber axis of the slit-like pore preferably satisfies 0.1 to 0.8, further preferably satisfies 0.2 to 0.6, and most preferably satisfies 0.3 to 0.5. As the size of the slit-like pore is larger, the amount of the gas flux is expected to be increased, but the uniformity of pores tends to decrease, and thus the slit-like pore preferably has the size in the above-described range. When the ratio of the diameter in the fiber axis direction to the diameter in the direction perpendicular to the fiber axis of pores is too small, the amount of the gas flux tends to decrease, whereas when the ratio is too large, a defect tends to occur and the strength tends to decrease, and thus the pore preferably has the ratio in the above-described range.

The size of the slit-like pore is a value determined by exposing the inner space of the hollow fiber by, for example, diagonally cutting the microporous hollow fiber membrane, and then observing the wall surface of the inner space with a scanning electron microscope (SEM) or a transmission electron microscope (TEM) to measure the size. That is, the circumscribed circle diameters of 100 pores randomly selected from the observation image were measured and evaluated as an average value. The circumscribed circle diameter means the diameter of the smallest perfect circle circumscribing a pore at two or more points.

The ratio (d1/d2) of the pore diameter d1 in the fiber axis direction to the pore diameter d2 in the direction perpendicular to the fiber axis was measured in the same manner as in the measurement of the size of the pore described above, each maximum length of the two directions of the fiber axis direction and the direction perpendicular to the fiber axis was evaluated as the diameter (see FIG. 1), and the ratio was evaluated as the average of the diameters of 100 pores randomly selected from the observation image.

Examples of the microporous hollow fiber membrane include a microporous hollow fiber membrane having a circular or elliptical cross section, and the dimensions thereof are not particularly limited, but the outer diameter is preferably 50 to 400 μm, the inner diameter is preferably 30 to 360 μm, and the membrane thickness is preferably 15 to 60 μm.

As a method of producing the microporous hollow fiber membrane, the melt spinning method is suitable from the viewpoint of increasing the productivity. The melt spinning method is also suitable from the viewpoint of obtaining a microporous hollow fiber membrane having not only the gas permeability and gas selectivity but also high strength.

Examples of the melt spinning method of producing the microporous hollow fiber membrane include a method in which laminated crystal lamellas are grown in the process of melt spinning a crystalline thermoplastic resin, heat treatment is performed as necessary, and then stretching is performed to cleave the amorphous part between laminated crystal lamellas.

The microporous hollow fiber membrane can be produced using a conventionally known spinneret. However, to obtain the microporous hollow fiber membrane, a uniform membrane thickness needs to be obtained and, for example, a method using a spinneret as described in Japanese Patent Laid-open Publication No. 9-296320 is suitably used.

The polymer that constitutes the microporous hollow fiber membrane preferably has hydrophobicity because gas selection efficiency is significantly reduced when the liquid surface enters the microporous portion of the porous supporting layer of the inner layer. Specifically, a polymer having hydrophobicity with a contact angle with water of 90° or more is preferable, and examples thereof include polyolefin resins such as polypropylene, polyethylene, polybutylene, and poly 4-methyl-1-pentene, fluororesins such as ethylene tetrafluoride, ethylene tetrafluoride-perfluoroalkylvinyl ether copolymer, and polyvinylidene fluoride, and polyacetal resins.

When the melt spinning method is selected, examples of the polymer that constitutes the microporous hollow fiber membrane include polyethylene and a copolymer thereof, polypropylene and a copolymer thereof, and poly 4-methyl-1 pentene and a copolymer thereof, and poly 4-methyl-1 pentene and a copolymer thereof are suitable from the viewpoint of obtaining high gas selectivity.

In the microporous hollow fiber membrane, a crystal nucleating agent is desirably added to the polymer. The addition of a crystal nucleating agent makes slit-like pores in the wall surface of the inner space of the hollow fiber fine and uniform. Thus, it is presumed that by the addition of a crystal nucleating agent, the crystal nucleation on the spinning line is promoted, and the lamellar crystals serving as the starting points for the formation of slit-like pores are uniformly and finely formed. As the crystal nucleating agent to be added, an additive having excellent heat resistance and a melting point in the vicinity of the spinning temperature is preferable, and examples thereof include Adekastab (registered trademark) NA-11, NA-21, NA-27, and NA-71 manufactured by ADEKA CORPORATION, GEL ALL (registered trademark) MD and DXR manufactured by New Japan Chemical Co., Ltd., and Irgaclear XT 386 manufactured by BASF SE.

In the production of the microporous hollow fiber membrane, heat treatment can be performed before stretching. The temperature condition of the heat treatment is preferably from the glass transition temperature to less than the melting point of the polymer that constitutes the microporous hollow fiber membrane, more preferably 80 to 220° C., further preferably 100 to 200° C., and most preferably 150 to 190° C. For the time condition for the heat treatment, the heat treatment for 1 minute to 24 hours is preferably performed, the heat treatment for 5 minutes to 12 hours is more preferably performed, and the heat treatment for 10 minutes to 6 hours is further preferably performed.

The microporous hollow fiber membrane is produced by stretching, and is preferably produced by two-stage stretching of cold stretching and hot stretching. The temperature condition of the cold stretching is preferably in the vicinity of the glass transition temperature or equal to or less than the glass transition temperature of the polymer that constitutes the microporous hollow fiber membrane, more preferably-30 to 80° C., further preferably-10 to 60° C., and most preferably 0 to 50° C. The condition of percent of stretch of the cold stretching is preferably a condition of a low percent of stretch, preferably 1.05 to 1.6 times, more preferably 1.1 to 1.5 times, and further preferably 1.2 to 1.4 times to make the size of pores formed minute and uniform while peeling between laminated lamellae is caused. The temperature condition of the hot stretching is preferably in the range from the glass transition temperature to the glass transition temperature of the polymer that constitutes the microporous hollow fiber membrane, more preferably 80 to 200° C., further preferably 100 to 180° C., and most preferably 120 to 150° C. The condition of percent of stretch of the hot stretching is preferably 1.05 to 2.0 times, more preferably 1.1 to 1.8 times, and further preferably 1.2 to 1.7 times to make the size of pores minute and uniform while expanding the pores formed by the cold stretching.

The microporous hollow fiber membrane has properties suitable for a gas separation membrane module and, for example, can be used in a deaeration membrane and an oxygenator.

When the microporous hollow fiber membrane is incorporated into a gas separation membrane module, the microporous hollow fiber membrane can be incorporated in a bundled state, and if necessary, the microporous hollow fiber membrane can be arranged in a sheet shape so that intervals between the microporous hollow fiber membranes are uniform.

The gas separation membrane module preferably has a form in which the microporous hollow fiber membrane is incorporated in a case, and the method of incorporating the microporous hollow fiber membrane is not particularly limited, but examples thereof include a method in which the microporous hollow fiber membrane is cut to a required length, the required number of the microporous hollow fiber membranes are bundled and then placed in a cylindrical case, a potting agent is added while the module is rotated by a centrifuge, after the potting agent is solidified, both ends of the microporous hollow fiber membrane are cut so that both ends are opened, and a header is attached.

EXAMPLES

Hereinafter, the microporous hollow fiber membrane will be specifically described with reference to Examples.

A. Fineness

The fineness of the microporous hollow fiber membrane was measured according to the formula using a 1.0 m ruler.

Fineness (dtex)=weight (g) of 1.0 m of microporous hollow fiber membrane×10,000

The measurement was performed five times per level, and the arithmetic average value of the measurements was used for calculation.

B. Tensile Strength and Elongation

Evaluation was performed by a tensile test in accordance with JIS L 1013:2010 (Testing methods for man-made filament yarns) 8.5.1. The measurement was performed five times per level, and the arithmetic average value of the measurements was used for calculation.

C. Gas Permeation Test (Amount of Gas Flux, Gas Selectivity, and Thickness of Functional Layer)

The amounts of the gas fluxes of carbon dioxide, nitrogen, and oxygen were evaluated by a differential pressure method in accordance with JIS K 7126-1:2006 (Plastics-Film and sheeting-Determination of gas-transmission rate-Part 1: Differential-pressure method). The measurement was performed twice per level, and the arithmetic average value of the measurements was used for calculation. The gas selectivity (carbon dioxide gas flux/nitrogen gas flux, oxygen gas flux/nitrogen gas flux) was calculated from the amount of each gas flux, and the thickness of the functional layer was evaluated using formulas (1) to (3).

D. Evaluation of Average Interconnected Pore Radius

The average interconnected pore radius was calculated from the pressure dependence of the gas flux based on the formulas using nitrogen gas.

$$JR = K \times \Delta P / L \tag{4}$$

JR: Nitrogen gas flow rate ($cm^3/cm^2/s/(dyn/cm^2$

ΔP: Pressure difference ($dyn/cm^2$), L: membrane thickness (cm)

$$K = K0 + (B0/\eta) \times \Delta P1 \tag{5}$$

K0: Knudsen transmission coefficient (($cm^3 \cdot cm/cm^2/s$)),

B0: Geometrical factor ($cm^3 \cdot cm/cm^2$),

η: Nitrogen gas viscosity ($dyn \cdot s/cm^2$), ΔP1: average pressure ($dyn/cm^2$)

$$2r = \frac{16}{3}\frac{B0}{K0}\sqrt{\frac{2RT}{\pi M}} \tag{6}$$

r: Average interconnected pore radius (cm), M: nitrogen gas molecular weight (g/mol)

The gas flux was measured while changing the pressure, the slope (B0/n) and the intercept (K0) of the graph were obtained by formula (5) based on the value of K obtained by formula (4) (see FIG. 4), and the obtained values were substituted into formula (3).

E. Evaluation of Size of Pore on Wall Surface of Inner Space of Hollow Fiber, d1, and d2

Figure 2:
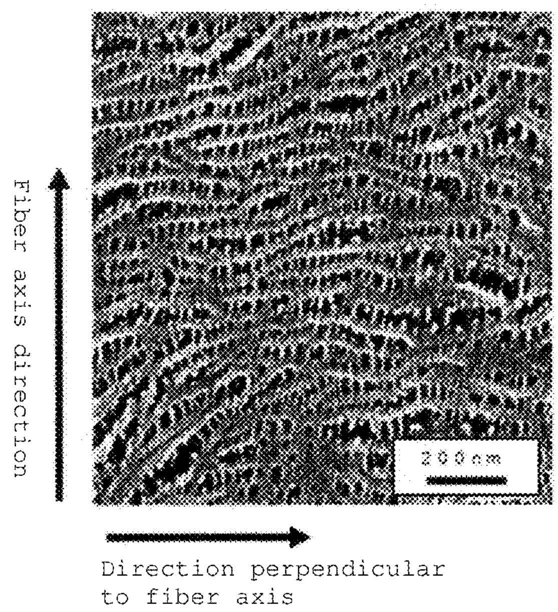
FIG. 2 shows an example of a morphology observation result (SEM photographed image) of a wall surface of an inner space of the hollow fiber.
Figure 3:
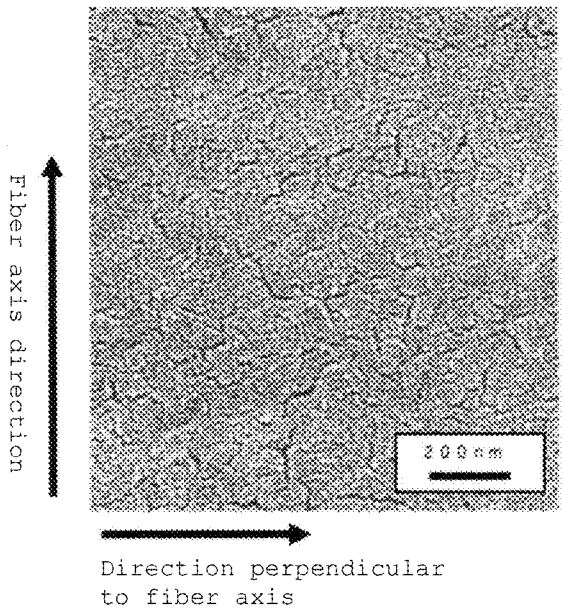
FIG. 3 shows an example of a morphology observation result (SEM photographed image) of the outermost layer of the hollow fiber.
Figure 4:
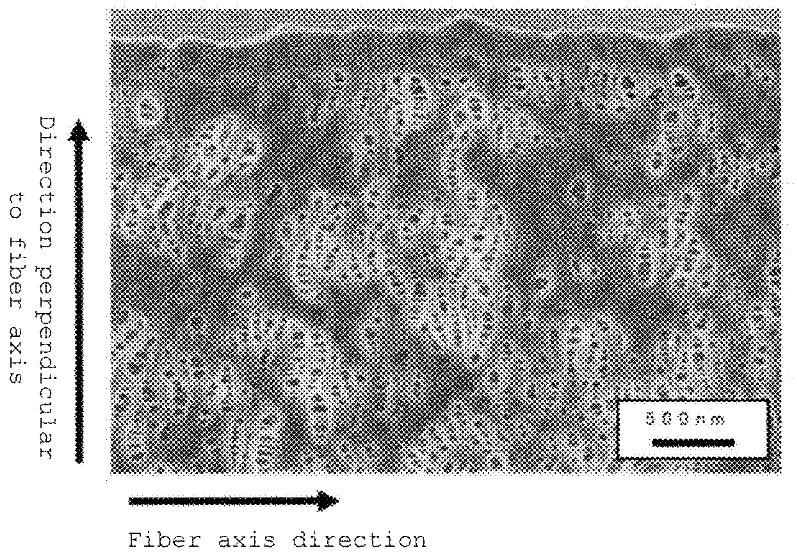
FIG. 4 shows an example of a morphology observation result (SEM photographed image) of the vicinity of the outermost layer in the cross section of the microporous hollow fiber membrane.

On an image obtained by SEM photographing the wall surface of the inner space of the hollow fiber at a magnification of 30,000 times, 100 pores randomly selected were evaluated, and the size, the diameter d1 in the fiber axis direction, and the diameter d2 in the direction perpendicular to the fiber axis were evaluated as average values. The size of pores was evaluated based on the circumscribed circle diameter, and the diameter d1 in the fiber axis direction and the diameter d2 in the direction perpendicular to the fiber axis were evaluated based on the maximum lengths in two directions of the fiber axis direction and the direction perpendicular to the fiber axis as diameters (see FIG. 1). An example of the morphology observation result of the wall surface of the inner space (SEM photographed image), an example of the morphology observation result of the outermost layer (SEM photographed image) in the hollow fiber, and an example of the morphology observation result in the vicinity of the outermost layer in the cross section of the microporous hollow fiber membrane (SEM photographed image) are shown in FIGS. 2 to 4, respectively.

F. Evaluation of Thickness of Skin Layer

The hollow fiber was embedded in an epoxy resin, frozen by FC•4E cryo sectioning system manufactured by Reichert, Inc., and cut with Reichert-Nissei ultracut N (ultramicrotome) equipped with a diamond knife. Then, the thickness of the skin layer was evaluated from an image obtained by photographing the cross section of the hollow fiber at a magnification of 100,000 to 300,000 using a transmission electron microscope (TEM) JEM 1400 Plus type manufactured by JEOL Ltd.

Example 1

A raw material obtained by adding 0.1 wt % of GEL ALL (registered trademark) MD manufactured by New Japan Chemical Co., Ltd. to poly 4-methyl-1-pentene (registered trademark: TPX, manufactured by Mitsui Chemicals, Inc.) was melt-spun at a spinning temperature of 290° C. using a two-orifice annular ring die with a center air hole having a structure capable of introducing a gas as a core material inside as the spinneret. In the melt spinning, the raw material was melt-extruded by a twin screw extruder, guided to the spinneret while being weighed by a gear pump, and wound at a spinning speed of 600 m/min (spinning draft 727) to obtain an unstretched yarn.

Then, the unstretched yarn was heat-treated in an atmosphere at 185° C. for 2 hours, then stretched 1.4 times at 30° C., and then stretched 1.4 times at 120° C. to obtain a microporous hollow fiber membrane having an outer diameter of 395 μm, an inner diameter of 310 μm, and a fineness of 161 dtex. The tensile strength, elongation, carbon dioxide gas flux, nitrogen gas flux, oxygen gas flux, gas selectivity, thickness of the skin layer, thickness of the functional layer, and average interconnected pore radius of the obtained microporous hollow fiber membrane were evaluated. The results are shown in Table 1.

Example 2

A microporous hollow fiber membrane having an outer diameter of 395 μm, an inner diameter of 310 μm, and a fineness of 158 dtex was obtained in the same manner as in Example 1 except that 0.1 wt % of GEL ALL (registered trademark) DXR manufactured by New Japan Chemical Co., Ltd. was added instead of GEL ALL (registered trademark) MD in Example 1. The morphology observation result in the vicinity of the outermost layer in the cross section of the obtained microporous hollow fiber membrane is shown in FIG. 5. The tensile strength, elongation, carbon dioxide gas flux, nitrogen gas flux, oxygen gas flux, gas selectivity, thickness of the skin layer, thickness of the functional layer, and average interconnected pore radius of the obtained microporous hollow fiber membrane were evaluated. The results are shown in Table 1.

Example 3

A microporous hollow fiber membrane having an outer diameter of 390 μm, an inner diameter of 310 μm, and a fineness of 156 dtex was obtained in the same manner as in Example 1 except that the addition amount of GEL ALL (registered trademark) MD was changed to 0.2 wt % in Example 1. The tensile strength, elongation, carbon dioxide gas flux, nitrogen gas flux, oxygen gas flux, gas selectivity, thickness of the skin layer, thickness of the functional layer, and average interconnected pore radius of the obtained microporous hollow fiber membrane were evaluated. The results are shown in Table 1.

Example 4

A microporous hollow fiber membrane having an outer diameter of 395 μm, an inner diameter of 310 μm, and a fineness of 154 dtex was obtained in the same manner as in Example 3 except that the heat treatment time was changed to 4 hours in Example 3. The tensile strength, elongation, carbon dioxide gas flux, nitrogen gas flux, oxygen gas flux, gas selectivity, thickness of the skin layer, thickness of the functional layer, and average interconnected pore radius of the obtained microporous hollow fiber membrane were evaluated. The results are shown in Table 1.

Example 5

A microporous hollow fiber membrane having an outer diameter of 390 μm, an inner diameter of 310 μm, and a fineness of 155 dtex was obtained in the same manner as in Example 4 except that 0.2 wt % of GEL ALL (registered trademark) DXR manufactured by New Japan Chemical Co., Ltd. was added instead of GEL ALL (registered trademark) MD in Example 4. The tensile strength, elongation, carbon dioxide gas flux, nitrogen gas flux, oxygen gas flux, gas selectivity, thickness of the skin layer, thickness of the functional layer, and average interconnected pore radius of the obtained microporous hollow fiber membrane were evaluated. The results are shown in Table 1.

Comparative Example 1

Figure 6:
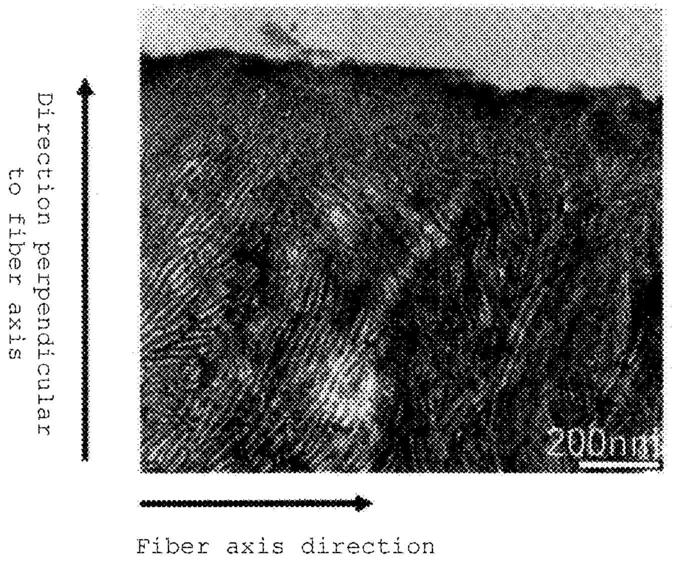
FIG. 6 shows an example of a morphology observation result (TEM photographed image) of the vicinity of the outermost layer in the cross section of the microporous hollow fiber membrane obtained in Comparative Example 1.

A microporous hollow fiber membrane having an outer diameter of 400 μm, an inner diameter of 320 μm, and a fineness of 200 dtex was obtained in the same manner as in Example 1 except that 0.1 wt % of GEL ALL (registered trademark) MD manufactured by New Japan Chemical Co., Ltd. was not added to the spinning raw material in Example 1. The morphology observation result in the vicinity of the outermost layer in the cross section of the obtained microporous hollow fiber membrane is shown in FIG. 6. The tensile strength, elongation, carbon dioxide gas flux, nitrogen gas flux, oxygen gas flux, gas selectivity, thickness of the skin layer, thickness of the functional layer, and average interconnected pore radius of the obtained microporous hollow fiber membrane were evaluated. The results are shown in Table 1.

Comparative Example 2

A microporous hollow fiber membrane having an outer diameter of 238 μm, an inner diameter of 167 μm, and a fineness of 98 dtex was obtained in the same manner as in Comparative Example 1 except that the spinning speed was changed to 1,000 m/min (spinning draft 1212) in Comparative Example 1. The tensile strength, elongation, carbon dioxide gas flux, nitrogen gas flux, oxygen gas flux, gas selectivity, thickness of the skin layer, thickness of the functional layer, and average interconnected pore radius of the obtained microporous hollow fiber membrane were evaluated. The results are shown in Table 1.

Comparative Example 3

A solution spinning solution of poly 4-methyl-1-pentene (registered trademark: TPX, manufactured by Mitsui Chemicals, Inc.) was prepared using dibutyl phthalate as a solvent, and wet-spun at 240° C. using a two-orifice annular ring die with a center air hole having a structure capable of introducing a gas as a core material inside as the spinneret. The solution was passed through air about 20 cm from the nozzle outlet, solidified in a coagulation bath of glycerin triacetate, wound, then washed with isopropanol, and dried at 120° C. for 24 hours to obtain a microporous hollow fiber membrane having an outer diameter of 400 μm, an inner diameter of 200 μm, and a fineness of 350 dtex. The tensile strength, elongation, carbon dioxide gas flux, nitrogen gas flux, oxygen gas flux, gas selectivity, thickness of the functional layer, and average interconnected pore radius of the obtained microporous hollow fiber membrane were evaluated. The results are shown in Table 1. The thickness of the skin layer could not be evaluated because a laminated crystal lamella structure was not found.

TABLE 1

| | | Example 1 | Example 2 | Example 3 | Example 4 | Example 5 |
|---|---|---|---|---|---|---|
| Outer diameter | [μm] | 395 | 395 | 390 | 395 | 390 |
| Inner diameter | [μm] | 310 | 310 | 310 | 310 | 310 |
| Membrane thickness | [μm] | 40 | 40 | 40 | 42 | 41 |
| Fineness | [dtex] | 161 | 158 | 156 | 154 | 155 |
| Tensile strength | [cN/dtex] | 1.0 | 1.0 | 1.0 | 1.0 | 1.0 |
| Elongation | [%] | 64 | 50 | 70 | 69 | 65 |
| Carbon dioxide gas flux | $\times 10^{-5}$ | 20.7 | 22.3 | 22.7 | 34.6 | 43.5 |
| Nitrogen gas flux | [$cm^3$(STP)/$cm^2$/sec/ | 15.0 | 12.5 | 11.1 | 25.8 | 32.7 |
| Oxygen gas flux | cmHg] | 16.6 | 15.2 | 15.4 | 29.8 | 36.5 |
| Gas selectivity (Carbon dioxide gas flux/nitrogen gas flux) | — | 1.38 | 1.78 | 2.05 | 1.34 | 1.34 |
| Gas selectivity (Oxygen gas flux/nitrogen gas flux) | — | 1.11 | 1.22 | 1.39 | 1.15 | 1.12 |

TABLE 1-continued

| | | | | | | |
|---|---|---|---|---|---|---|
| Thickness of functional layer | [μm] | 1.0 | 0.7 | 0.6 | 0.6 | 0.5 |
| Average interconnected pore radius | [μm] | 0.002 | 0.002 | 0.002 | 0.003 | 0.003 |
| Size of pore on wall surface of inner space of hollow fiber | [μm] | 313 | 252 | 278 | 282 | 231 |
| Pore diameter d1 in fiber axis direction | [μm] | 118 | 104 | 83 | 85 | 76 |
| Pore diameter d2 in direction perpendicular to fiber axis | [μm] | 302 | 253 | 273 | 276 | 230 |
| d1/d2 | — | 0.39 | 0.41 | 0.3 | 0.31 | 0.33 |

| | | Comparative Example 1 | Comparative Example 2 | Comparative Example 3 |
|---|---|---|---|---|
| Outer diameter | [μm] | 400 | 238 | 400 |
| Inner diameter | [μm] | 320 | 167 | 200 |
| Membrane thickness | [μm] | 40 | 36 | 100 |
| Fineness | [dtex] | 200 | 98 | 350 |
| Tensile strength | [cN/dtex] | 0.6 | 1.0 | 0.2 |
| Elongation | [%] | 40 | 25 | 301 |
| Carbon dioxide gas flux | $\times10^{-5}$ | 3.7 | 28.2 | 20.0 |
| Nitrogen gas flux | [$cm^3$(STP)/$cm^2$/sec/ | 2.0 | 24.8 | 3.3 |
| Oxygen gas flux | cmHg] | 2.5 | 25.7 | 8.02 |
| Gas selectivity (Carbon dioxide gas flux/nitrogen gas flux) | — | 1.80 | 1.14 | 6.15 |
| Gas selectivity (Oxygen gas flux/nitrogen gas flux) | — | 1.2 | 1.04 | 2.47 |
| Thickness of functional layer | [μm] | 4.4 | 1.0 | 0.5 |
| Average interconnected pore radius | [μm] | 0.006 | 0.008 | 0.010 |
| Size of pore on wall surface of inner space of hollow fiber | [μm] | 453 | 419 | 1040 |
| Pore diameter d1 in fiber axis direction | [μm] | 193 | 159 | 996 |
| Pore diameter d2 in direction perpendicular to fiber axis | [μm] | 449 | 403 | 771 |
| d1/d2 | — | 0.43 | 0.39 | 1.29 |

INDUSTRIAL APPLICABILITY

The microporous hollow fiber membrane has high gas permeability, gas selectivity, and strength, and can be suitably used as a gas separation membrane.

The invention claimed is:

1. A microporous hollow fiber membrane, having a carbon dioxide gas flux of $10\times10^{-5}$ to $200\times10^{-5}$ ($cm^3$(STP)/$cm^2$/sec/cmHg), a value (carbon dioxide gas flux/nitrogen gas flux) obtained by dividing a value of a carbon dioxide gas flux ($cm^3$(STP)/$cm^2$/sec/cmHg) by a value of a nitrogen gas flux ($cm^3$(STP)/$cm^2$/sec/cmHg) of 1.3 or more, and and a tensile strength of 0.5 cN/dtex or more, a nitrogen gas flux of $8\times10^{-5}$ to $160\times10^{-5}$ ($cm^3$(STP)/$cm^2$/sec/cmHg).

2. The microporous hollow fiber membrane according to claim 1, having an oxygen gas flux of $9\times10^{-5}$ to $180\times10^{-5}$ ($cm^3$(STP)/$cm^2$/sec/cmHg), and a value (oxygen gas flux/nitrogen gas flux) obtained by dividing a value of an oxygen gas flux ($cm^3$(STP)/$cm^2$/sec/cmHg) by a value of a nitrogen gas flux ($cm^3$(STP)/$cm^2$/sec/cmHg) of 1.15 or more.

3. The microporous hollow fiber membrane according to claim 1, wherein the microporous hollow fiber membrane has, on its outermost surface, a skin layer composed of crystals in the form of fine-grained particles having a diameter of 10 nm or less, the skin layer having a thickness of 200 nm or more, the thickness being defined as the shortest distance from a laminated crystal lamella to the fiber surface.

4. The microporous hollow fiber membrane according to claim 1, wherein the microporous hollow fiber is formed of a hydrophobic material having interconnected pores with an average interconnected pore radius of 0.005 μm or less.

5. The microporous hollow fiber membrane according to claim 1, comprising a slit-like pore on a wall surface of an inner space of a hollow fiber.

6. A gas separation membrane module, comprising the microporous hollow fiber membrane according to claim 1.

7. A microporous hollow fiber membrane, having a carbon dioxide gas flux of $10\times10^{-5}$ to $200\times10^{-5}$ ($cm^3$(STP)/$cm^2$/sec/cmHg), a value (carbon dioxide gas flux/nitrogen gas flux) obtained by dividing a value of a carbon dioxide gas flux ($cm^3$(STP)/$cm^2$/sec/cmHg) by a value of a nitrogen gas flux ($cm^3$(STP)/$cm^2$/sec/cmHg) of 1.3 or more, and a tensile strength of 0.5 cN/dtex or more, wherein the microporous hollow fiber membrane comprises a slit-like pore on a wall surface of an inner space of a hollow fiber.

8. The microporous hollow fiber membrane according to claim 7, having an oxygen gas flux of $9\times10^{-5}$ to $180\times10^{-5}$ ($cm^3$(STP)/$cm^2$/sec/cmHg), and a value (oxygen gas flux/nitrogen gas flux) obtained by dividing a value of an oxygen gas flux ($cm^3$(STP)/$cm^2$/sec/cmHg) by a value of a nitrogen gas flux ($cm^3$(STP)/$cm^2$/sec/cmHg) of 1.15 or more.

9. The microporous hollow fiber membrane according to claim 7, wherein the microporous hollow fiber membrane has, on its outermost surface, a skin layer composed of crystals in the form of fine-grained particles having a diameter of 10 nm or less, the skin layer having a thickness of 200 nm or more, the thickness being defined as the shortest distance from a laminated crystal lamella to the fiber surface.

10. The microporous hollow fiber membrane according to claim 7, wherein the microporous hollow fiber membrane is formed of a hydrophobic material having interconnected pores with an average interconnected pore radius of 0.005 μm or less.

11. A gas separation membrane module, comprising the microporous hollow fiber membrane according to claim 7.

12. A microporous hollow fiber membrane, having a carbon dioxide gas flux of $10\times10^{-5}$ to $200\times10^{-5}$ ($cm^3$(STP)/$cm^2$/sec/cmHg), a value (carbon dioxide gas flux/nitrogen gas flux) obtained by dividing a value of a carbon dioxide gas flux ($cm^3$(STP)/$cm^2$/sec/cmHg) by a value of a nitrogen gas flux ($cm^3$(STP)/$cm^2$/sec/cmHg) of 1.3 or more, and a tensile strength of 0.5 cN/dtex or more, wherein the microporous hollow fiber membrane has, on its outermost surface, a skin layer composed of crystals in the form of fine-grained particles having a diameter of 10 nm or less, the skin layer having a thickness of 200 nm or more, the thickness being defined as the shortest distance from a laminated crystal lamella to the fiber surface.

13. The microporous hollow fiber membrane according to claim 12, having an oxygen gas flux of $9\times10^{-5}$ to $180\times10^{-5}$ ($cm^3$(STP)/$cm^2$/sec/cmHg), and a value (oxygen gas flux/nitrogen gas flux) obtained by dividing a value of an oxygen gas flux ($cm^3$(STP)/$cm^2$/sec/cmHg) by a value of a nitrogen gas flux ($cm^3$(STP)/$cm^2$/sec/cmHg) of 1.15 or more.

14. The microporous hollow fiber membrane according to claim 12, wherein the microporous hollow fiber membrane is formed of a hydrophobic material having interconnected pores with an average interconnected pore radius of 0.005 μm or less.

15. A gas separation membrane module, comprising the microporous hollow fiber membrane according to claim 12.

16. A microporous hollow fiber membrane, having a carbon dioxide gas flux of $10\times10^{-5}$ to $200\times10^{-5}$ ($cm^3$(STP)/$cm^2$/sec/cmHg), a value (carbon dioxide gas flux/nitrogen gas flux) obtained by dividing a value of a carbon dioxide gas flux ($cm^3$(STP)/$cm^2$/sec/cmHg) by a value of a nitrogen gas flux ($cm^3$(STP)/$cm^2$/sec/cmHg) of 1.3 or more, and a tensile strength of 0.5 cN/dtex or more, wherein the microporous hollow fiber membrane is formed of a hydrophobic material having interconnected pores with an average interconnected pore radius of 0.005 μm or less.

17. The microporous hollow fiber membrane according to claim 16, having an oxygen gas flux of $9\times10^{-5}$ to $180\times10^{-5}$ ($cm^3$(STP)/$cm^2$/sec/cmHg), and a value (oxygen gas flux/nitrogen gas flux) obtained by dividing a value of an oxygen gas flux ($cm^3$(STP)/$cm^2$/sec/cmHg) by a value of a nitrogen gas flux ($cm^3$(STP)/$cm^2$/sec/cmHg) of 1.15 or more.

18. A gas separation membrane module, comprising the microporous hollow fiber membrane according to claim 16.

* * * * *